United States Patent
Nakadate et al.

(10) Patent No.: US 7,502,714 B2
(45) Date of Patent: Mar. 10, 2009

(54) DEVICE, METHOD AND PROGRAM FOR OPTIMIZATION ANALYSIS

(75) Inventors: Mami Nakadate, Kawasaki (JP); Nobutaka Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/017,962

(22) Filed: Dec. 22, 2004

(65) Prior Publication Data

US 2006/0052984 A1 Mar. 9, 2006

(30) Foreign Application Priority Data

Aug. 17, 2004 (JP) ............... 2004-237701

(51) Int. Cl.
 G21C 17/00 (2006.01)
 G06F 11/30 (2006.01)
 G06F 15/00 (2006.01)

(52) U.S. Cl. ............... 702/182; 700/97; 703/8; 705/4; 706/19

(58) Field of Classification Search ............. 702/81–84, 702/119, 123, 127, 181–183; 700/29, 97; 703/7, 21, 8; 705/7, 28, 4; 706/19
See application file for complete search history.

(56) References Cited

U.S. PATENT DOCUMENTS

| | | | | |
|---|---|---|---|---|
| 5,930,155 | A * | 7/1999 | Tohi et al. ............... | 703/8 |
| 6,411,945 | B1 * | 6/2002 | Nakajima ............... | 706/19 |
| 6,920,364 | B2 * | 7/2005 | Nonaka et al. ............... | 700/97 |
| 2002/0177985 | A1 * | 11/2002 | Kraft et al. ............... | 703/7 |
| 2003/0033179 | A1 * | 2/2003 | Katz et al. ............... | 705/7 |
| 2005/0119919 | A1 * | 6/2005 | Eder ............... | 705/4 |

FOREIGN PATENT DOCUMENTS

| | | |
|---|---|---|
| JP | 5-088711 | 4/1993 |
| JP | 2001-205683 | 7/2001 |
| JP | 2001-243268 | 9/2001 |

OTHER PUBLICATIONS

JP 2001-243268: "Method and device for supporting optimal design and recording medium recording it's program", Abstract drawings, and Detailed description., Kubo et al., PubDate: Jul. 9, 2001.*

* cited by examiner

Primary Examiner—John H Le
(74) Attorney, Agent, or Firm—Staas & Halsey LLP

(57) ABSTRACT

The present invention relates to optimization analysis achieving a target value and provides a device, method and program ensuring improved analysis efficiency and analysis accuracy. The device includes an analysis unit (CPU 14), an evaluation unit (CPU 14) and a condition modification unit (CPU 14). The analysis unit executes an analysis with analysis conditions imparted thereto. The evaluation unit evaluates the analysis results. The condition modification unit modifies the analysis conditions imparted to the analysis unit, based on the evaluation results. An optimum solution is thus derived by performing one or more analyses through the modification of the given analysis conditions.

24 Claims, 11 Drawing Sheets

FIG. 6

| SPECIFICATION | | | | | | | | | | | MANUFACTURER | | | | | | |
|---|---|---|---|---|---|---|---|---|---|---|---|---|---|---|---|---|---|
| No. | SPEC | CATEGORY CLASS | TEMPERATURE TEMP | SPECIFIC HEAT CP | HEAT CONDUCTIVITY CTCⅡ | COEFFICIENT OF LINEAR EXPANSION CTEⅡ | DENSITY DEN | TENSILE ELASTICITY E11 | POISSON'S RATIO NU | YIELD STRESS YS | PULL STRENGTH US | ELONGATION PERCENTAGE Elongation | SOURCE | APPLICATION | REGISTRANT | DATE OF REGISTRATION | EDITION NUMBER | REASON OF RE-EDITION | NONLINEAR DATA |
| | | | ℃ | kJ/kg·k | W/m·k | /℃ [×10-5] | kg/mm3 | N/mm2 | | N/mm2 | N/mm2 | % | | | | | | | |
| 1 | XXX1 | METAL | 23 | | 123.00 | 1.23 | 9.99 | 123456.0 | | | | | ABCD | AAA | FFJ | 04/12/10 | 1 | NEW REGISTRATION | NONE |
| 2 | XXX2 | METAL | 23 | 1.234 | 4.56 | 0.12 | 8.88 | 234567.0 | | | 177.77 | | | | FFJ | 04/12/10 | 1 | NEW REGISTRATION | NONE |
| 3 | XXX3 | METAL | 23 | 3.456 | 3.21 | 0.45 | 7.77 | 198765.0 | 0.330 | | 133.33 | | | | FFJ | 04/12/10 | 1 | NEW REGISTRATION | NONE |
| 4 | XXX4 | METAL | 23 | | 154.00 | 1.89 | 6.66 | 23456.0 | | | | | EFGH | AAA | FFJ | 04/12/10 | 1 | NEW REGISTRATION | NONE |
| 5 | XXX5 | METAL | 23 | | 165.00 | 1.89 | 5.55 | 112345.0 | | | | | HIJK | AAA | BBB | FFJ | 04/12/10 | 1 | NEW REGISTRATION | NONE |
| 6 | XXX6 | METAL | 23 | 1.789 | 45.67 | 0.99 | 4.44 | 165498.0 | | | | | | | FFJ | 04/12/10 | 1 | NEW REGISTRATION | NONE |
| 7 | XXX7 | METAL | 23 | | 321.00 | 1.89 | 3.33 | 145623.0 | | | | | LMNO | AAA | BBB | FFJ | 04/12/10 | 1 | NEW REGISTRATION | NONE |
| 8 | XXX8 | METAL | 23 | | 234.00 | 1.33 | 2.22 | 129665.0 | | | | | QRST | AAA | BBB | FFJ | 04/12/10 | 1 | NEW REGISTRATION | NONE |
| 9 | XXX9 | METAL | 23 | | 200.11 | 0.56 | 2.11 | 345678.0 | | | | | | | FFJ | 04/12/10 | 1 | NEW REGISTRATION | NONE |
| 10 | XX10 | METAL | 23 | 3.210 | 10.98 | 0.01 | 3.12 | 65432.0 | | | 999.00 | | | | FFJ | 04/12/10 | 1 | NEW REGISTRATION | NONE |
| 11 | XX11 | METAL | 23 | | 3.21 | 0.44 | | 312457.0 | | | | | | | FFJ | 04/12/10 | 1 | NEW REGISTRATION | NONE |
| 12 | XX12 | METAL | 23 | | 289.10 | 0.55 | 4.56 | 456789.0 | | | | | | | FFJ | 04/12/10 | 1 | NEW REGISTRATION | NONE |

DEVICE, METHOD AND PROGRAM FOR OPTIMIZATION ANALYSIS

BACKGROUND OF THE INVENTION

1. Field of the Invention

The present invention relates generally to optimization analysis for use in structural analysis for e.g., designing products and evaluating their reliabilities, and, more particularly, to a device, method and program for optimization analysis which attempt to streamline the analysis by enabling access to a plurality of systems for e.g., setting and modifying analysis conditions.

2. Description of the Related Art

For the structural analysis, although a concept referred to as an "inverse analysis" conventionally exists, the inverse analysis remains confined to finding values as a simulation. Although a solver with an "optimum calculation" function conventionally exists, the optimum calculation remains to the degree of a function for cutting down dimensions (models) and increasing the thickness. Also, a conventional analysis system can not calculate costs from design drawings and, furthermore, a dedicated cost calculation system must be launched for a cost calculation.

Patent documents for these structural analyses exist as Japanese Patent Application Laid-Open Publication Nos. 2001-243268, H05-88711 and 2001-205683.

For these structural analyses, Japanese Patent Application Laid-Open Publication No. 2001-243268 discloses optimum design support device and method for the purpose of attempting to improve search efficiency in an optimization technique as well as attempting to improve accuracy of an optimum solution. The configuration disclosed in Japanese Patent Application Laid-Open Publication No. 2001-243268 repeatedly performs an operation for searching the optimum solution by changing input parameters until target specifications are satisfied, and attempts to improve search efficiency of optimization by successively introducing information considered as inappropriate for the design, which is generated in an optimum solution search system process, and by using the information as limiting value of optimum solution in searching direction.

Japanese Patent Application Laid-Open Publication No. H05-88711 discloses a method and device for the purpose of facilitating systematic assembly line planning without biased fields by a designer without know-how and accumulation of knowledge. The optimization of the assembly line is performed by reading CAD information corresponding to a desired production method, calculating working hours required to assemble parts based on the CAD information, executing process design which completes the working hours within standard time and which satisfies the desired production method, converting results of the process design into simulation models and executing simulations with simulation conditions modified until simulation results conform to judgment conditions.

Japanese Patent Application Laid-Open Publication No. 2001-205683 discloses an injection molding process simulation device which enables to reviewing optimization of design items such as shapes of molded objects, molding conditions, physical properties of materials and metal mold structures, and this simulation device includes processing which analyzes a filling process, a pressure keeping process and a mold cooling process and which calculates resin behavior data until filling rates for all the minute elements become less than pre-designated values.

By the way, in the conventional analysis system, if calculations are executed with initially input analysis conditions, only the results of the calculations are obtained; analysts and designers are requested to search conditions for target values; and answers can not be obtained about what items should be set to what values to obtain the target values. Therefore, product development man-hours and design man-hours increase. Also, in the aspect of costs, since the cost calculation can not be performed from materials, dimensions and process method reflected on the drawings, a clue for obtaining an optimum solution can not be found in short period of time. Above problems are not disclosed in Japanese Patent Application Laid-Open Publication Nos. 2001-243268, H05-88711 and 2001-205683, and solutions for the problems are neither disclosed nor suggested.

SUMMARY OF THE INVENTION

The present invention relates to optimization analysis for achieving target values and it is an object thereof to enhance the analysis efficiency and analysis accuracy.

Another object of the present invention is to provide a device, method and program for optimization analysis adding cost evaluations to analysis results to obtain optimum solutions reflecting the costs.

In order to achieve the above objects, according to an aspect of the present invention there is provided an optimization analysis device comprising an analysis unit executing an analysis with analysis conditions imparted thereto; an evaluation unit evaluating analysis results of the analysis unit; and a condition modification unit modifying the analysis conditions imparted to the analysis unit, based on the evaluation results of the evaluation unit, the optimization analysis device operable to perform one or more analyses through the modification of the analysis conditions to derive an optimum solution.

According to such a structure, when applying any analysis condition selected from a plurality of analysis conditions prepared in advance to an analysis unit, the analysis unit executes an analysis with the analysis condition. The analysis result of the analysis unit is evaluated by an evaluation unit. Based on this evaluation, a condition modification unit modifies the analysis condition, and new analysis is executed by the analysis unit to which the analysis condition is applied. By modifying the analysis condition in this way, one or more of analyses are executed and an optimum solution is derived. The plurality of analysis conditions include both of the case of the same types of analysis conditions and the case of the different types of analysis conditions, and in the case of the same types of analysis conditions, for example, if physical properties are considered as analysis conditions, a major point is that the physical properties with different degrees (values) are also considered as a plurality of analysis conditions. Therefore, modification of the analysis condition refers to modification to an analysis condition with different types or degrees for all these analysis conditions.

In the optimization analysis device, priorities may be given to the analysis conditions such that the analysis conditions are imparted to the analysis unit in order of priority. The analysis unit may select input parameters depending on the analysis conditions to execute the analysis. The analysis conditions may be physical property values, constraints or dimensions of a product. The analysis unit may search approximate physical property values from a material database in case that the physical property values are imparted as the analysis conditions. The analysis unit may calculate a heat conductivity or a wind velocity condition by the analysis in case that the constraints of the product are selected as the analysis conditions. The analysis unit may generate a model using the dimensions as parameters and modify the model by the analysis in case that the dimensions of the product are selected as the analysis conditions. The device may be operable to change the physical property values, constraints or dimensions as the analysis conditions imparted to the analysis unit to derive an optimum solution.

In order to achieve the above objects, according to another aspect of the present invention there is provided an optimization analysis device comprising an analysis unit executing an analysis with analysis conditions imparted thereto; an evaluation unit evaluating analysis results of the analysis unit; a conversion unit converting the analysis results into prices; a price evaluation unit evaluating the prices obtained by the conversion unit; and a condition modification unit modifying the analysis conditions imparted to the analysis unit, based on evaluation results of the evaluation unit or of the price evaluation unit, the optimization analysis device operable to perform one or more analyses through the modification of the analysis conditions to derive an optimum solution. In other words, this optimization analysis device adds a price evaluation unit to the already described optimization analysis device and enables modification of analysis conditions based on evaluation results of the price evaluation unit. According to such a structure, the cost of the optimum solution can be reflected, since analysis conditions based on the evaluation results of the price evaluation are imparted to the modification of analysis conditions.

In the optimization analysis device, the analysis conditions may be physical property values, constraints or dimensions of a product. The analysis unit may search approximate physical property values from a material database in case that the physical property values are imparted as the analysis conditions. The analysis unit may calculate a heat conductivity or a wind velocity condition by the analysis in case that the constraints of the product are selected as the analysis conditions. The analysis unit may generate a model using the dimensions as parameters and modify the model by the analysis in case that the dimensions of the product are selected as the analysis conditions. The device may be operable to change the physical property values, constraints or dimensions as the analysis conditions imparted to the analysis unit to derive an optimum solution. The conversion unit may calculate a product cost from one or both of a design drawing and a selected material of a product.

In order to achieve the above objects, according to still another aspect of the present invention there is provided an optimization analysis method comprising analyzing with given analysis conditions; evaluating analysis results of the analyzing; modifying the given analysis conditions based on evaluation results of the evaluating, and performing one or more analyses through the modification of the given analysis conditions to derive an optimum solution. According to such a structure, based on the evaluation of analysis results, the analysis condition is modified, an analysis is executed, and an optimum solution with high accuracy is derived.

The modifying the given analysis condition may include specifying analysis conditions from prioritized analysis conditions in order of priority.

In order to achieve the above objects, according to yet another aspect of the present invention there is provided an optimization analysis method comprising analyzing with given analysis conditions; evaluating analysis results of the analyzing; converting the analysis results into prices; evaluating the prices obtained by the converting; and modifying the analysis conditions based on evaluation results of the analysis results or of the prices; and performing one or more analyses through the modification of the analysis conditions to derive an optimum solution.

In order to achieve the above objects, according to a further aspect of the present invention there is provided an optimization analysis program run by a computer, the program comprising the steps of analyzing with given analysis conditions; evaluating analysis results of the analyzing; modifying the given analysis conditions based on evaluation results of the evaluating; and performing one or more analyses through the modification of the given analysis conditions to derive an optimum solution. Such a structure allows the above described optimization analysis method to be implemented by means of a computer.

In order to achieve the above objects, according to a still further aspect of the present invention there is provided an optimization analysis program run by a computer, the program comprising the steps of analyzing with given analysis conditions; evaluating the results of the analyzing; modifying the given analysis conditions from prioritized analysis conditions in order of priority and providing the modified analysis conditions; and performing analyses through the priority-based modification of the given analysis conditions to derive an optimum solution.

In order to achieve the above object, according to a yet further aspect of the present invention there is provided an optimization analysis program run by a computer, the program comprising the steps of analyzing with given analysis conditions; evaluating analysis results of the analyzing; converting the analysis results into prices; evaluating the prices obtained by the converting; modifying the given analysis conditions based on evaluation results of the analysis results or the prices; and performing one or more analyses through the modification of the given analysis conditions to derive an optimum solution.

As set forth hereinabove, the present invention relates to optimization analysis for use in structural analysis for e.g., designing products and evaluating their reliabilities, and because of repeatedly performing the analysis with modified analysis conditions and of using accesses to a plurality of systems for the analysis, the present invention can obtain streamlined, speeded-up and higher-accuracy analyses and is extremely useful.

Features and advantages of the present invention are listed as follows.

(1) Since an analysis is performed with changing analysis conditions, analysis efficiency is enhanced and analysis results with higher accuracy can be obtained.

(2) According to the present invention, product development man-hours and design man-hours can be reduced.

(3) By adding cost conditions to modification of analysis condition, an optimum solution can be obtained reflecting an aspect of costs.

BRIEF DESCRIPTION OF THE DRAWINGS

The above and other objects, aspects, features and advantages of the present invention will become more apparent from the following description of the embodiments when taken in conjunction with the accompanying drawings, in which:

FIG. 6 shows an example of a data map of a material database;

DETAILED DESCRIPTION OF THE PREFERRED EMBODIMENTS

First Embodiment

Figure 1:
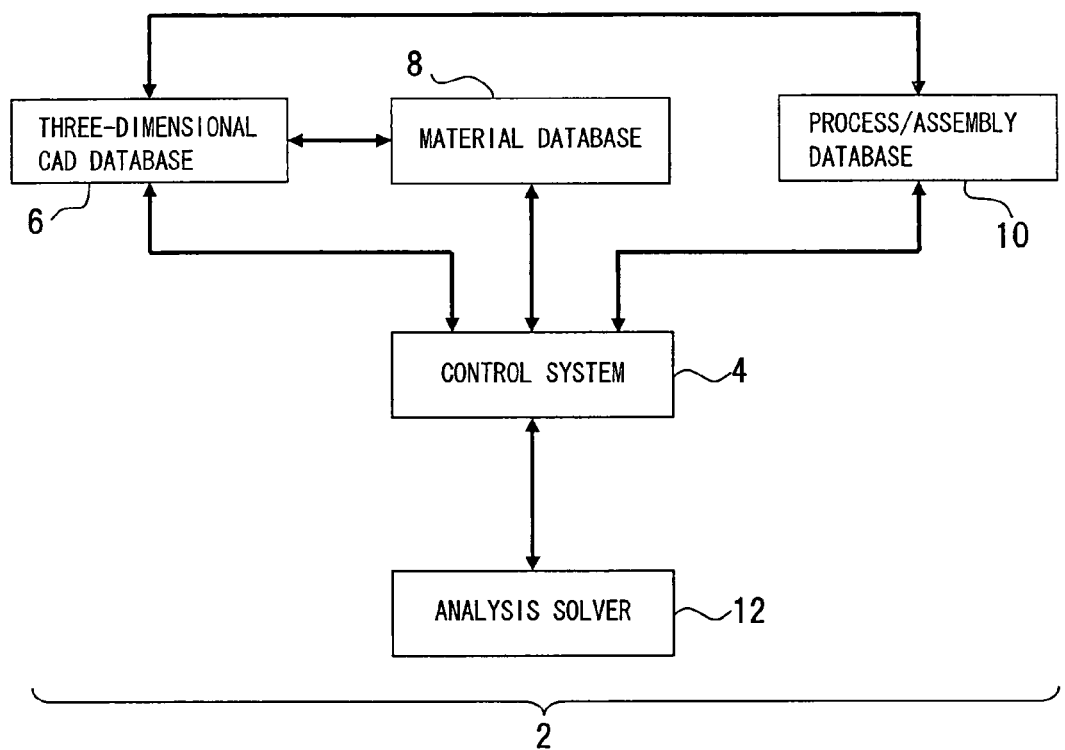
FIG. 1 is a block diagram showing an optimization analysis device in accordance with a first embodiment.

A first embodiment of the present invention will be described with reference to FIGS. 1 and 2. FIG. 1 shows an optimization analysis device in accordance with a first embodiment and FIG. 2 shows a hardware structure of a control system in the optimization analysis device.

The optimization analysis device 2 closely coordinates a plurality of systems for setting analysis conditions, enhances simplicity and continuity (seamlessness) of access to the systems and, specifically, establishes a data format intervening between a control sequence and an analysis input file or a result file. The optimization analysis device 2 in accordance with this embodiment is shown as an application example of a substrate design, is comprised of a control system 4 executing an optimization analysis as core and coordinates the control system 4, a three-dimensional CAD (Computer Aided Design) database 6, a material database 8, a process/assembly database 10 and an analysis solver 12. The control system 4 consists of, for example, single or a plurality of computers, constitutes an analysis unit for analyzing optimum solutions, an evaluation unit for evaluating analysis results, a condition modification unit for modifying analysis conditions, a price evaluation unit and the like and, specifically, executes a numerical analysis, analysis condition modification, model calculation, cost calculation and the like. The three-dimensional CAD database 6 is data constructed by systems for supporting generation of design information relevant to various design operations. The material database 8 stores physical property values of various materials and the like. The process/assembly database 10 stores various data relevant to product processes and assembly or costs, such as materials, processes, assembly man-hours, unit price data and the like. The analysis solver 12 is, for example, a system calculating an optimum value from predefined conditions by means of linear programming. In this case, the three-dimensional CAD database 6, the material database 8, the process/assembly database 10 and the analysis solver 12 may be constructed by the same computer as the control system 4 or may be constructed by other coordinated computer.

This optimization analysis device 2 conducts a calculation with initially input analysis conditions and returns conditions and parameters for obtaining target values of analysts or designers to the control system 4 side, and an optimum value can be obtained by repeating numerical analysis. Specifically, cost calculations are conducted using models and materials as an initial analysis conditions, materials, dimensions and process methods described in the CAD database, and cost cutting is also enabled. In other words, in the aspect of costs, cost calculations can be made from input information reflected on drawings and a clue for cost cutting can be found in short period of time.

Figure 2:
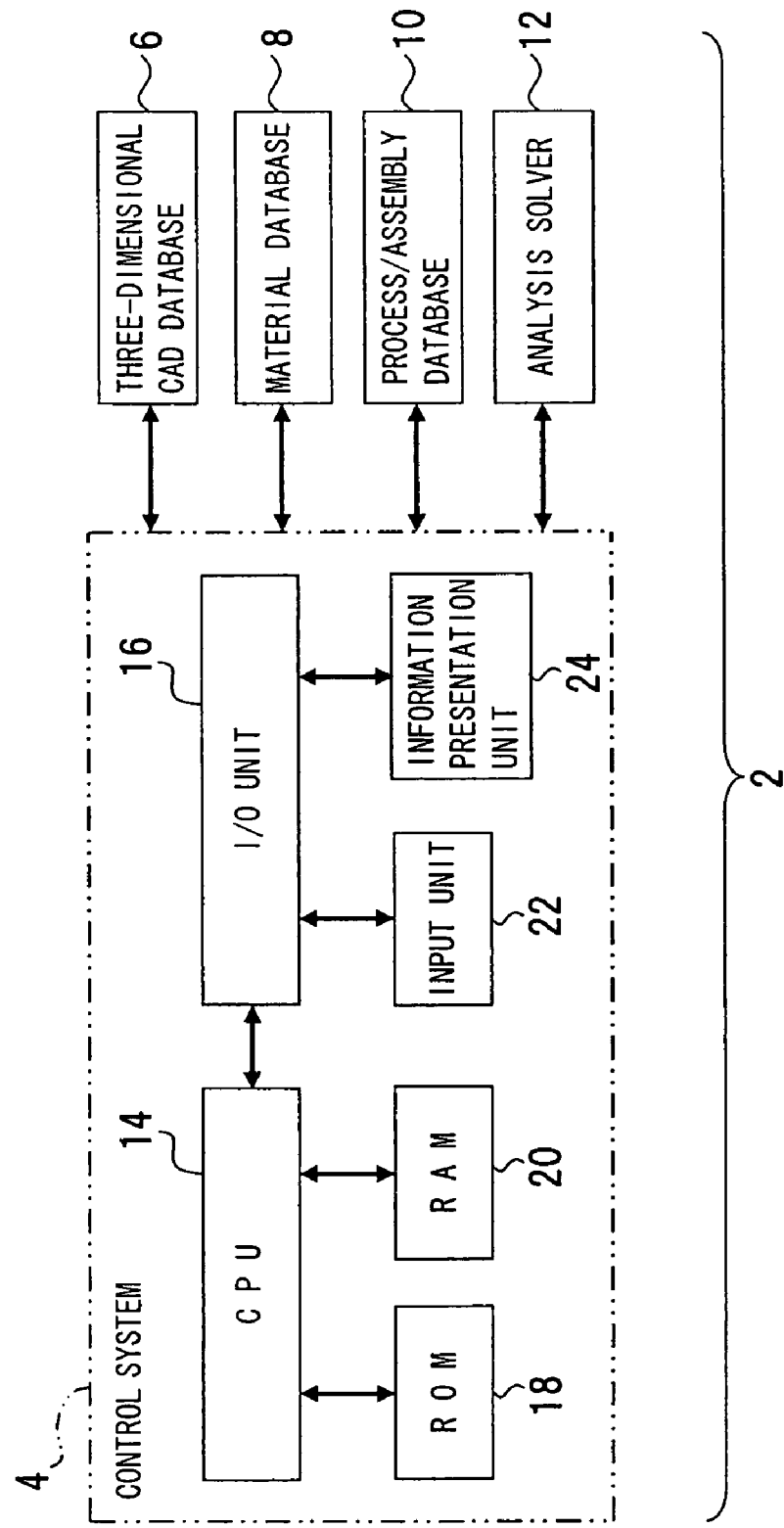
FIG. 2 is a block diagram showing a hardware structure of a control system.

In this optimization analysis device 2, as shown in FIG. 2, the control system 4 consists of CPU (Central processing unit) 14, an I/O (Input Output) unit 16, ROM (Read-Only Memory) 18, RAM (Random-Access Memory) 20, an input unit 22, an information presentation unit 24 and the like. CPU 14 executes programs stored in ROM 18 and the I/O unit 16 is given input data of dimensions, materials, conditions and the like through the input unit 22 and the like. These input data include output data from the three-dimensional CAD database 6, the material database 8, the process/assembly database 10 and the analysis solver 12. ROM 18 is a recording medium storing various programs such as an optimization analysis program. RAM 20 stores data being calculated in analysis processing and the like. The input unit 22 consists of a keyboard and the like, and the information presentation unit 24 consists of LCD (Liquid Crystal Display) display unit and a printer so that screen display and print output can be obtained. An optimization analysis program according to the present invention may be stored in various recording media other than above described ROM 18 and not limited by a form or a format of the recording medium.

Figure 3:
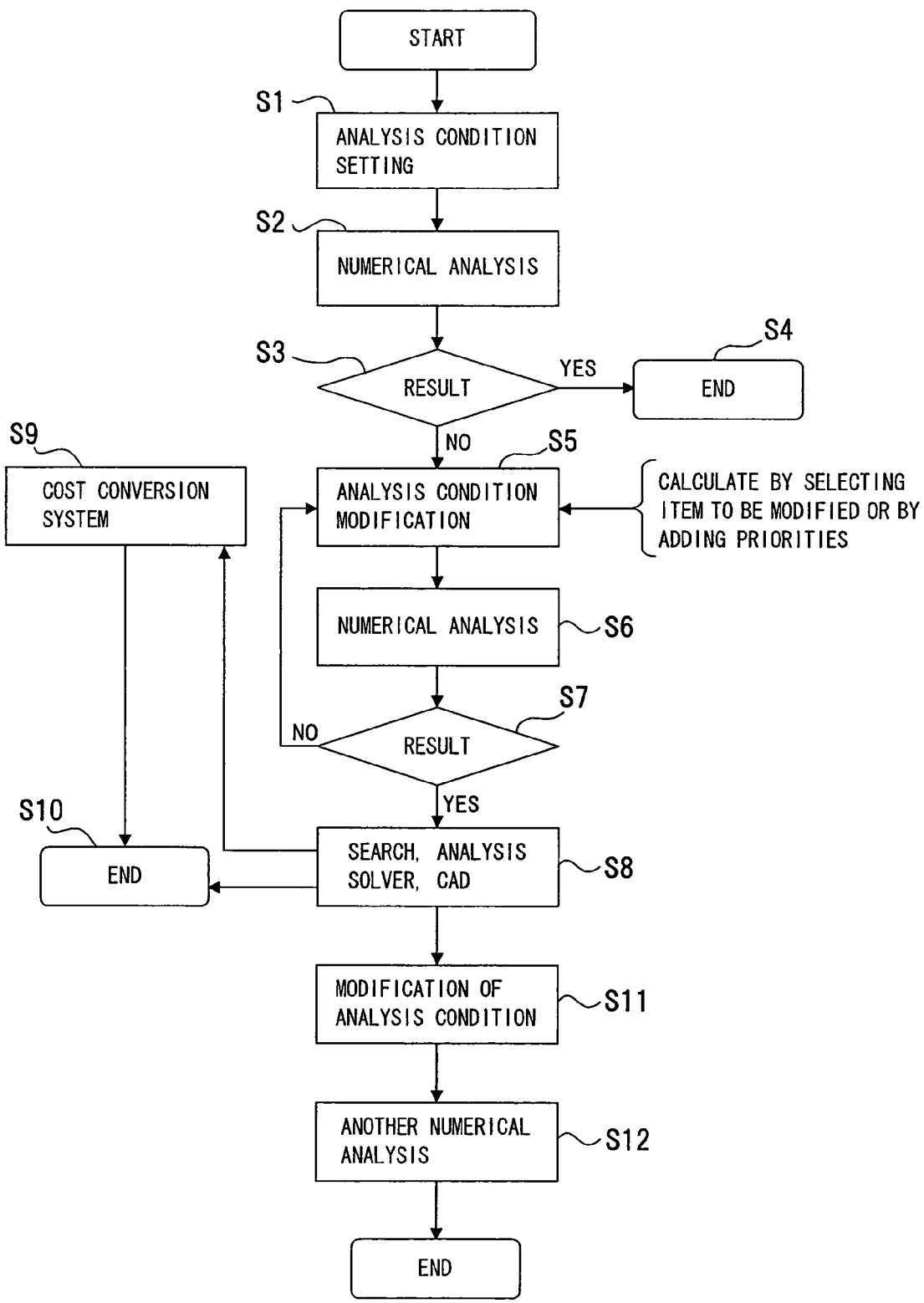
FIG. 3 is a flowchart showing processing procedures as an embodiment in accordance with an optimization analysis method or program.

Optimization analysis processing will then be described with reference to FIG. 3. FIG. 3 shows processing procedures as an embodiment in accordance with the optimization analysis method or program of the present invention.

The optimization analysis processing is started and analysis conditions are set (step S1). The analysis conditions are physical property values, constraints such as temperature and joining, materials and the like. By setting the analysis conditions, a numerical analysis is executed (step S2); the analysis result is judged, or specifically, it is decided whether the analysis result is optimum or not (step S3); and if the evaluation result is optimum, the analysis processing is terminated (step S4). If the evaluation result is not preferable, the analysis conditions are modified (step S5) to execute the numerical analysis again with the modified analysis conditions (step S6), and by evaluating the analysis result, it is decided whether the analysis result is optimum or not (step S7). In the modification of the analysis conditions (step S5), the analysis conditions are calculated by selecting items to be modified and prioritizing the items.

If the analysis result is not preferable in step S7, the processing is returned to step S5 to modify the analysis conditions and to repeat the analysis (steps S5 to S7). If the numerical analysis result is optimum, each of the data is referenced as search processing utilizing other systems and databases such as the analysis solver 12 and the three-dimensional CAD database 6 (step S8); a cost conversion system is activated to execute cost calculations (step S9); the calculations are evaluated; and if the evaluation result is optimum, the analysis processing is completed (step S10).

Also, in step S8, as the result of the reference to each of the data utilizing other systems and databases such as the analysis solver 12 and the three-dimensional CAD database 6, the analysis conditions are modified (step S11) to execute other numerical analysis with the modified analysis conditions (step S12), and the analysis processing is completed by obtaining the optimum solution.

According to such a structure, since the analysis is repeated by modifying the analysis conditions as the initial condition to other analysis conditions, analysis accuracy can be improved; higher efficiency of the analysis can be attempted to be achieved; and time required to obtain the optimum solution can be speeded up. By prioritizing and selecting the analysis conditions to execute the analysis, efficient analysis processing can be performed. By using the cost conversion system at the same time to reflect cost conditions on the analysis, the optimum solution can be obtained in the aspect of costs.

Also, in this embodiment, since other analysis systems and databases are used at the same time, other parameters can be utilized in the analysis with the analysis conditions, the optimum solution with higher accuracy can be derived by utilizing wide range of data.

Also, in this embodiment, since other analysis is executed again with modified analysis conditions after the analysis solution is obtained using other analysis systems and databases at the same time, accuracy of the analysis can be improved.

Second Embodiment

Figure 4:
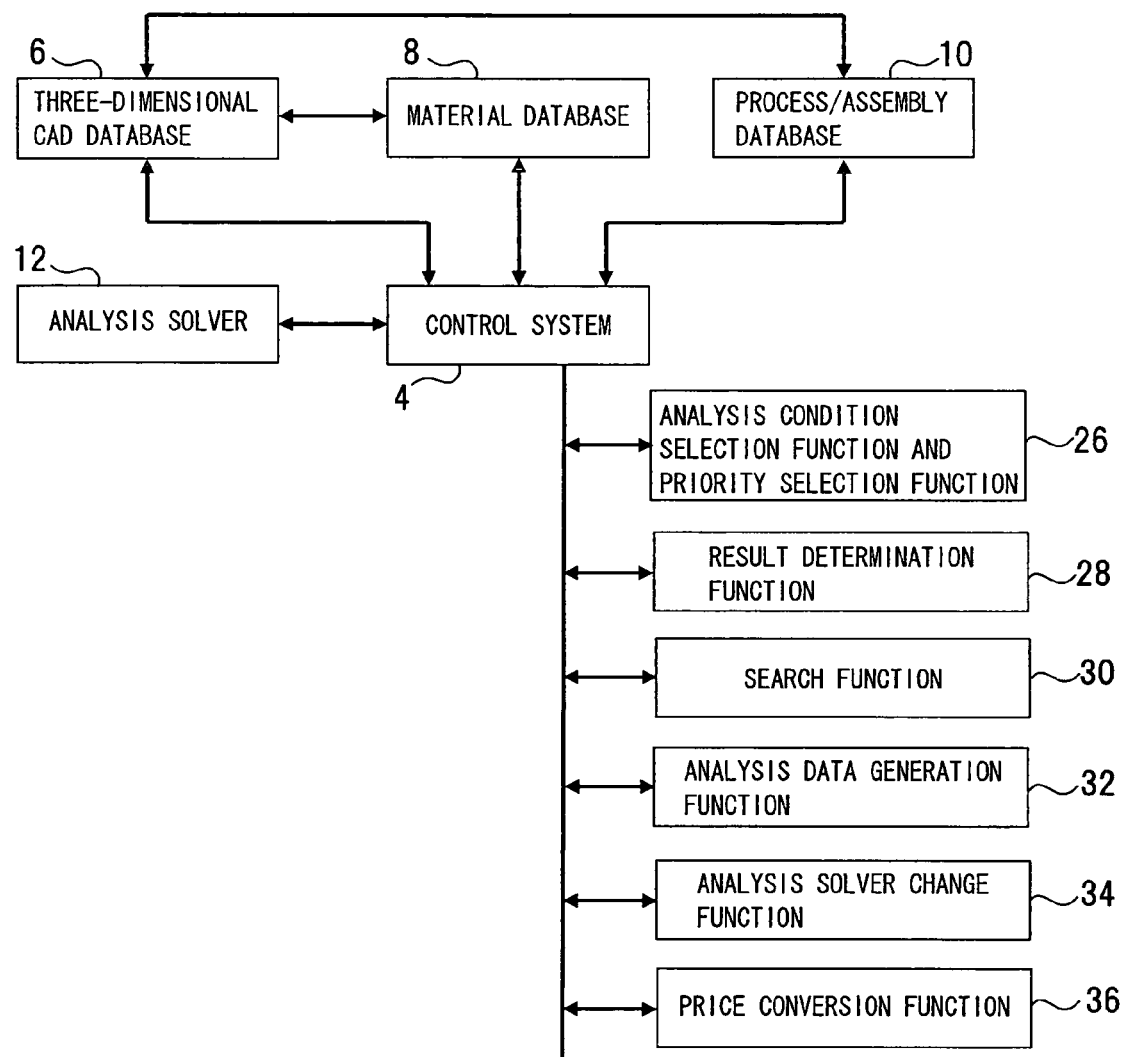
FIG. 4 is a block diagram showing an optimization analysis device in accordance with a second embodiment.
Figure 5:
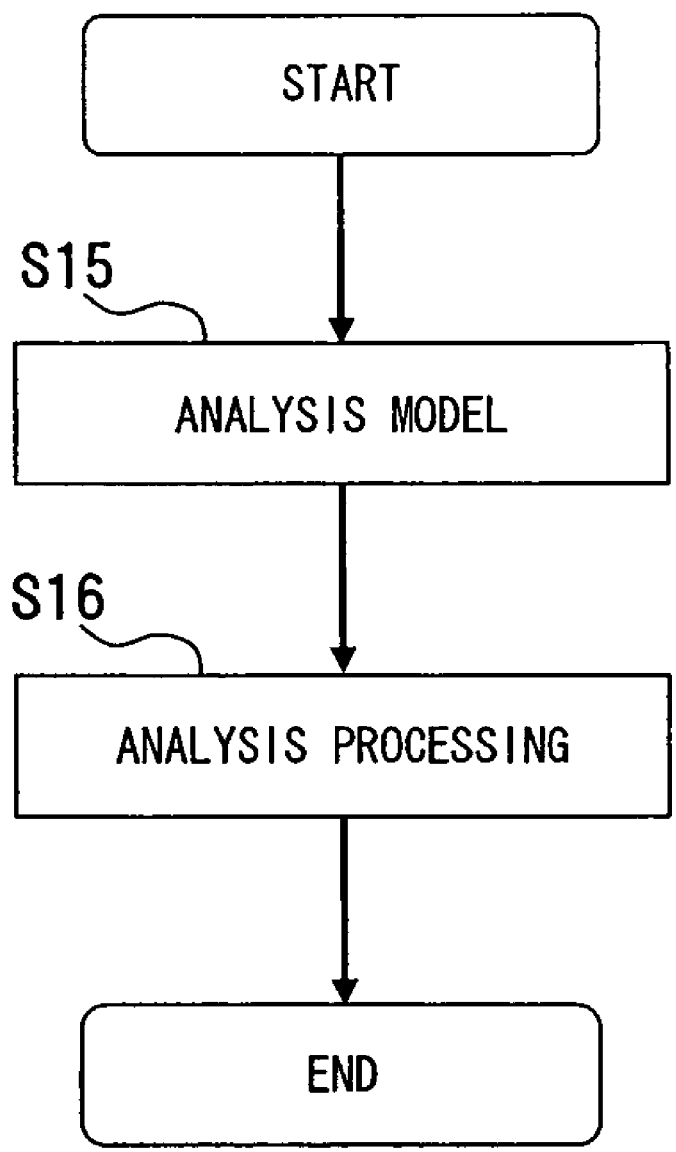
FIG. 5 is a flowchart showing processing procedures of an analysis solver.

A second embodiment of the present invention will be described with reference to FIGS. 4, 5 and 6. FIG. 4 shows an optimization analysis device in accordance with the second embodiment; FIG. 5 shows a flowchart showing processing procedures of the analysis solver; and FIG. 6 shows an example of a data map of a material database. The same symbols are imparted to the same portion as the first embodiment.

The control system 4 is comprised of various functions such as an analysis condition selection function and priority selection function 26, a result determination function 28, a search function 30, an analysis data generation function 32, an analysis solver change function 34 and a price conversion function 36. The analysis condition selection function and priority selection function 26 is a function for selecting the analysis conditions, adding priorities to the analysis conditions and selecting the analysis conditions in order of the priority. The result judgment function 28 is a function for determining whether the analysis result is the optimum solution or not. The search function 30 is a function for searching data from each of databases 6, 8, 10 based on designated items. The analysis data generation function 32 is a function for generating various data as parameters used in the analysis in response to the setting of the analysis conditions. The analysis solver change function 34 is a function for changing, for example, the currently executed analysis solver to other analysis solver when various analysis solvers are connected. The price conversion function 36 is a function for referring to price data in the process/assembly database 10 and calculating the costs.

As shown in FIG. 5, on the side of the analysis solver 12, as the analysis processing, an analysis model is generated (step S15) and the analysis processing is performed (step S16), and after the processing are terminated, the procedure returns to the control system 4.

As shown in FIG. 6, the material database 8 stores physical property values such as a specification, category, temperature, specific heat, heat conductivity, coefficient of linear expansion, density, tensile elasticity, Poisson's ratio, yield stress, pull strength and elongation percentage as well as unique information such as a manufacturer, source, application, registrant, date of registration, edition number, reason of re-edition and nonlinear data, categorized by materials. When using this material database 8, by selecting a material MX, physical property values and unique values thereof can be searched, and material names can be selected from the property values and unique values.

Figure 7:
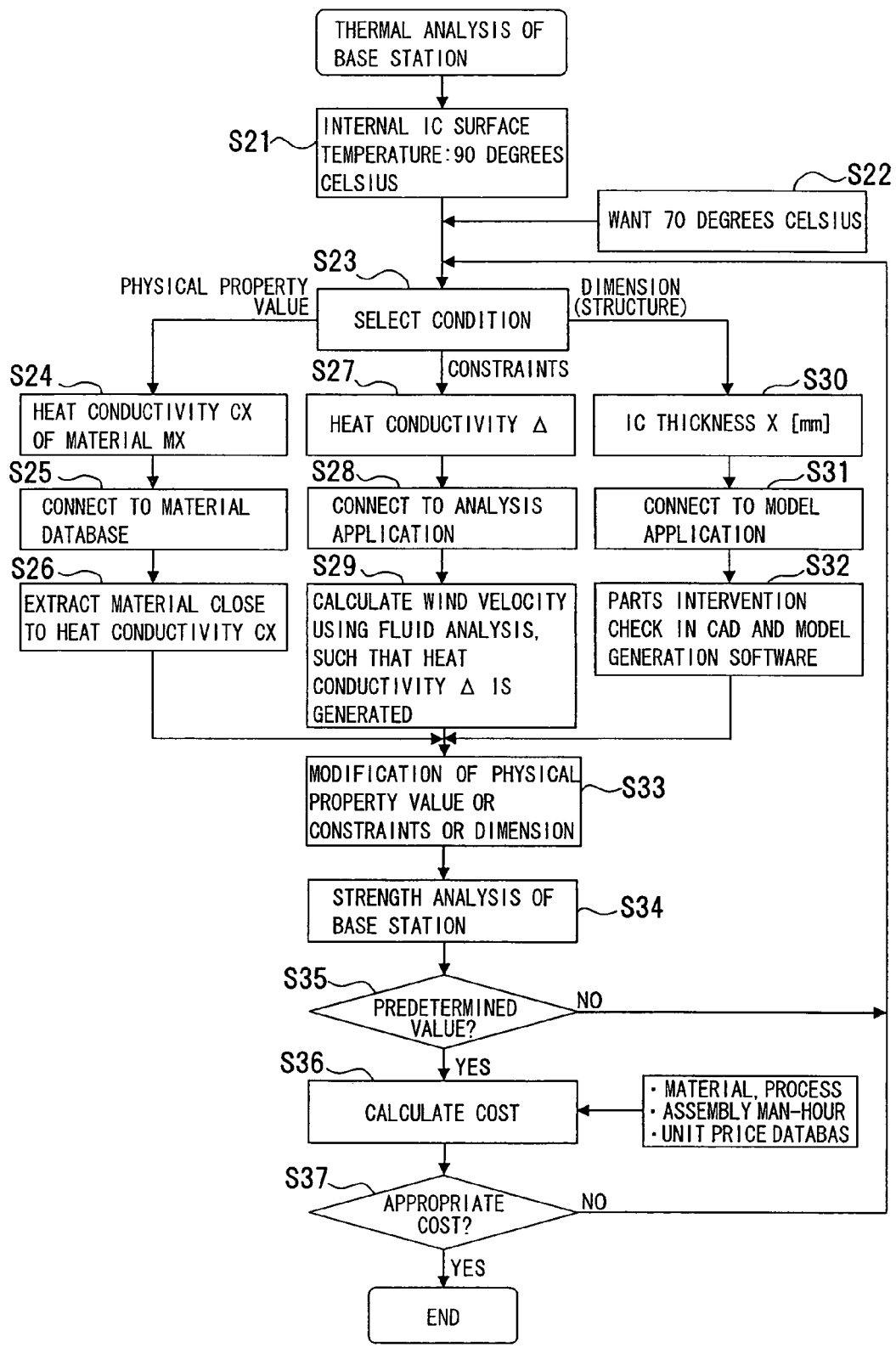
FIG. 7 is a flowchart showing processing procedures of a heat transmission analysis as an embodiment in accordance with an optimization analysis method or program.
Figure 8:
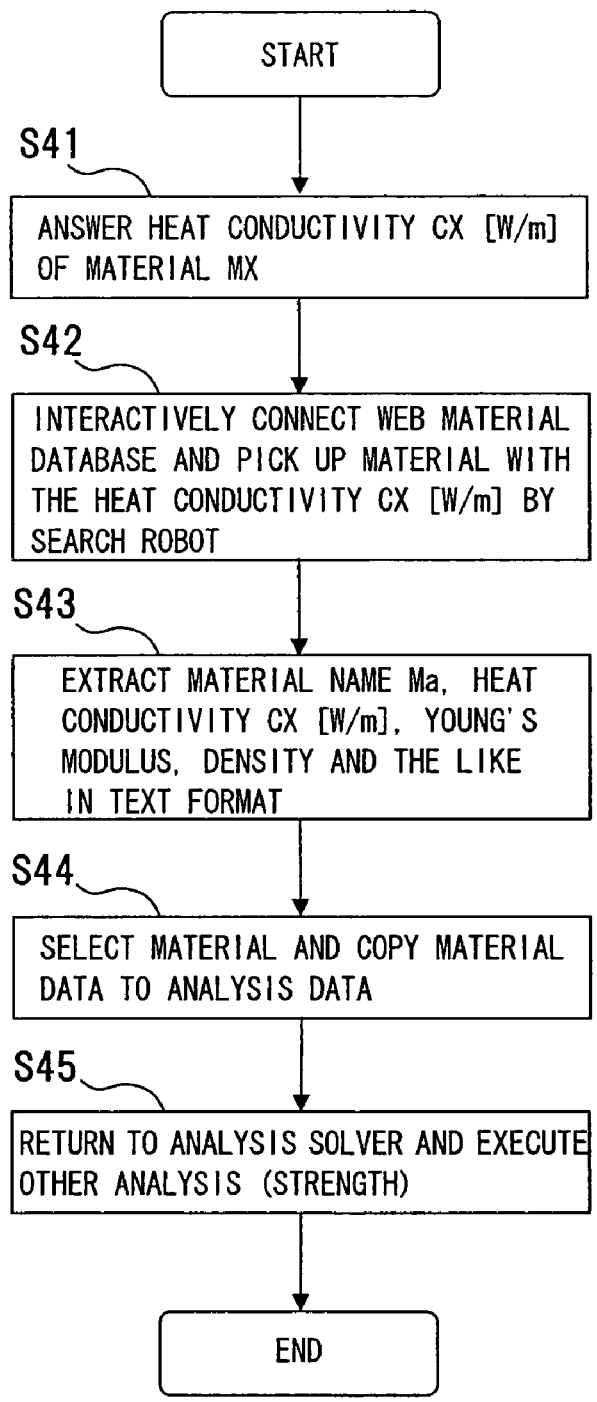
FIG. 8 is a flowchart showing a subroutine of physical property value modification processing.
Figure 9:
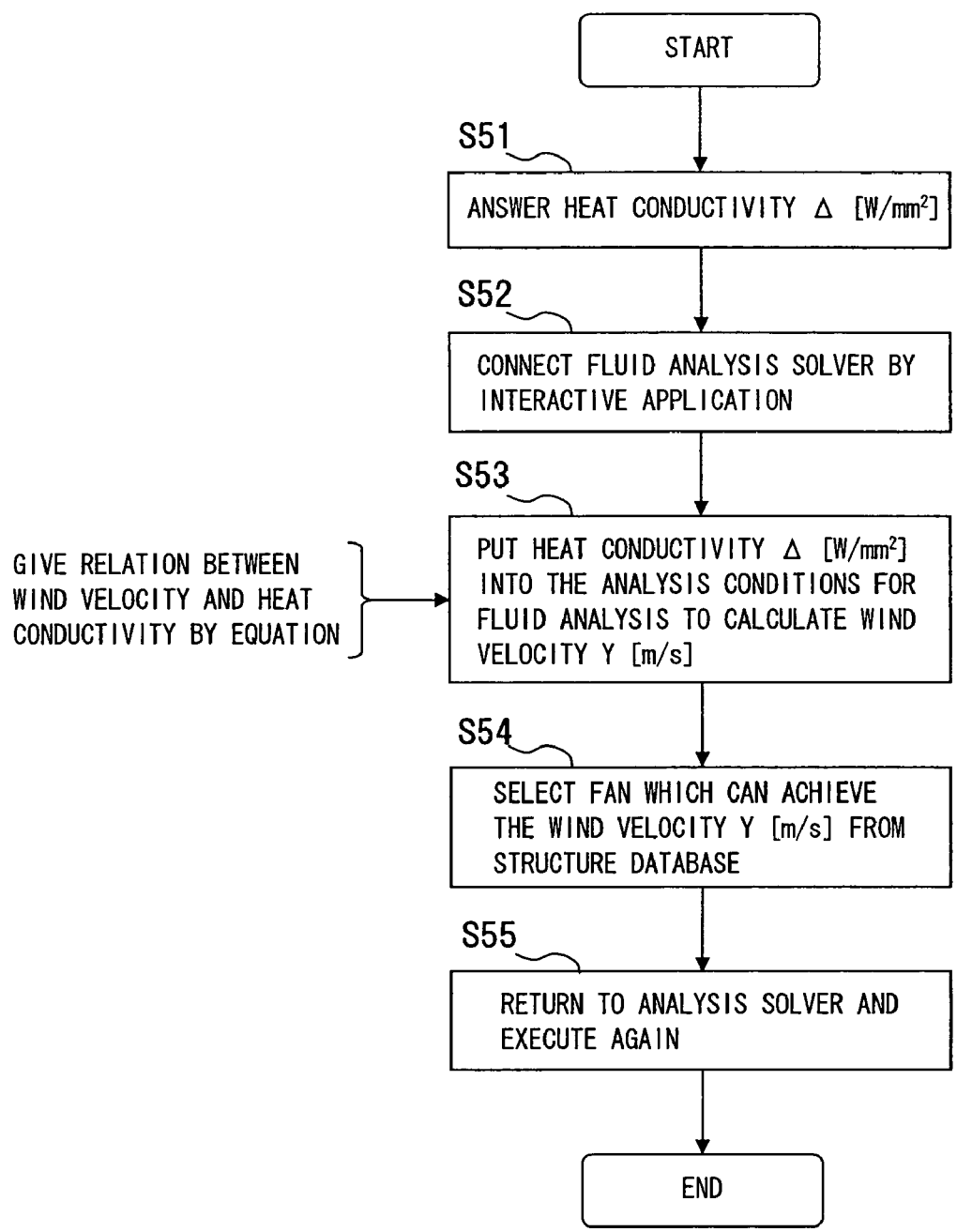
FIG. 9 is a flowchart showing a subroutine of constraints modification processing.
Figure 10:
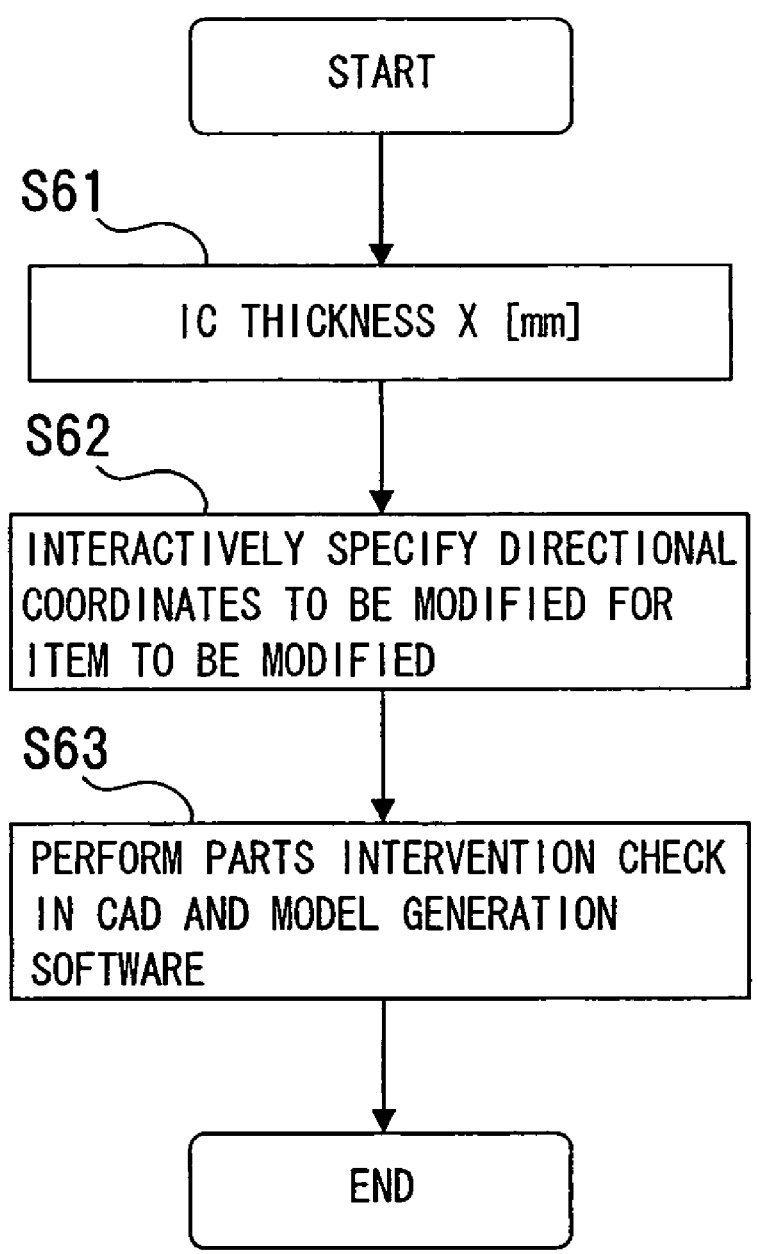
FIG. 10 is a flowchart showing a subroutine of dimension modification processing.

The optimization analysis processing will be described with reference to FIG. 7 to FIG. 10. FIG. 7 shows a flowchart showing processing procedures of a heat transmission analysis as an embodiment in accordance with the optimization analysis method or program of the present invention; FIG. 8 shows a flowchart showing processing procedures of a subroutine of physical property value modification processing; FIG. 9 shows a flowchart showing processing procedures of a subroutine of constraints modification processing; and FIG. 10 shows a flowchart showing processing procedures of a subroutine of dimension modification processing.

This heat transmission analysis is a thermal analysis of a base station of a telephone station and the like. It is assumed that a limit value of an internal IC surface temperature is a predefined temperature, for example, 90 degrees Celsius, for an exchanger installed in the base station (step S21). If the IC surface temperature is requested to become a target value, for example, a target temperature of 70 degrees Celsius (step S22), then analysis conditions are set corresponding to this target value, which are, for example, physical property values, constraints such as temperatures and joining, and dimensions (models). Then, any analysis condition is selected in this condition selection (step S23).

For example, when the physical property value is selected as the analysis condition, a heat conductivity CX of a certain material MX is selected as a parameter of the physical property value (step S24); other system, for example, the material database 8 is connected (step S25); and a material MX is extracted as an optimum solution, such as stainless which is nearest to the described heat conductivity CX, from the material database 8 (step S26).

Also, for example, when the constraints is selected as the analysis condition, a heat conductivity A is selected as a parameter of the constraints (step S27); other system, for example, an analysis application is connected (step S28); and a wind velocity is calculated using a fluid analysis, such that the optimum heat conductivity $\Delta$ is generated. In this case, the heat conductivity $\Delta$ is calculated when cooling can be achieved by flowing air.

Also, for example, when the dimension (structure) is selected as the analysis condition, a thickness X [mm] of IC is selected as a parameter for example (step S30); other system, for example, an model application is connected (step S31); and a parts intervention check is performed for such as impossibility of mounting on the substrate due to confliction of the parts in CAD and model generation software (step S32). In IC, as a thickness increases, a heat releasing area also increases so that better heat releasing can be achieved. The parts intervention check includes dynamic avoidance of intervention by setting the parameters in the case that, for example, a parts removal machine conflicts with a mold and can not remove the parts in a molding device.

After the optimum solution is obtained through setting and modification of, for example, physical property values, constraints or dimensions as the analysis condition (step S33) for a product which is the optimum solution, a strength analysis is executed for that product in the base station (step S34); it is determined whether the analysis result of the strength analysis is a predetermined value or not (step S35); if the result is not the predetermined value, the procedure is returned to step S23, and by changing selection of the analysis condition, or by changing the value of the analysis condition in the case of the analysis condition of the same type, the analysis is executed for step S24 to S26, step S27 to S29 or step S30 to S32.

If the analysis result of the strength analysis reaches to the predetermined value, the result is converted to the cost of that product as other analysis (step S36). In this case, calculation of the cost is executed by making reference to materials, processes, calculation of assembly man-hours or an unit price database. Then, it is determined whether the calculated cost is an appropriate cost or not (step S37), and if the cost is not the appropriate cost, the optimum solution is obtained by modifying the analysis conditions again until the appropriate cost is achieved.

In this embodiment, when the analysis conditions are modified in the case that the analysis result is not optimum, the analysis may be executed by adding priorities to the analysis conditions in advance and selecting the analysis conditions in order of priority. By applying the analysis conditions in order of priority, speed to the optimum solution is accelerated; an efficient analysis can be executed; and the accuracy of the analysis is improved.

By the way, for example, as shown in FIG. 8, the physical property modification processing (step S24 to S26) receives an answer for the heat conductivity CX of the material MX (step S41), interactively connects a web material database and picks up a material with the heat conductivity CX [W/m] by a search robot (step S42), and extracts a material name Ma, heat conductivity CX [W/m], Young's modulus, density and the like in text format, for example (step S43). Also, the processing selects a material and copies the material data to the analysis data (step S44), returns to the analysis solver 12 and executes other analysis (strength) (step S45), and terminates the subroutine.

For example, as shown in FIG. 9, the constraints modification processing (step S27 to S29) receives an answer for the heat conductivity Δ [W/mm²] of the material MX (step S51), connects a fluid analysis solver by an interactive application (step S52), puts the heat conductivity Δ [W/mm²] into the analysis conditions for the fluid analysis to calculate a wind velocity Y [m/s] (step S53). In this processing, a relational expression between a wind velocity and the heat conductivity Δ is applied, which is represented by Equation (1). The relational expression between a wind velocity and the heat conductivity Δ is given as follows:

$$Nux=0.0296Rex^{0.8}Pr/\{1+2.11Rex^{-0.1}(Pr-1)\} \quad (1)$$

In Equation (1), Re: Reynolds number, Nu: Nussalt number, Pr: Prandtl number. The wind velocity is calculated from the Equation (1) (step S53).

A fan is selected from a structure database, which can achieve the wind velocity Y [m/s] calculated in this processing (step S54), and the analysis is executed again by returning to the analysis solver 12 (step S55).

For example, as shown in FIG. 10, the dimension modification processing (step S30 to S32) receives an answer for the thickness X [mm] of IC (step S61), interactively specifies directional coordinates to be modified for an item to be modified (step S62), performs a parts intervention check in CAD and model generation software (step S63), and terminates the subroutine.

Figure 11:
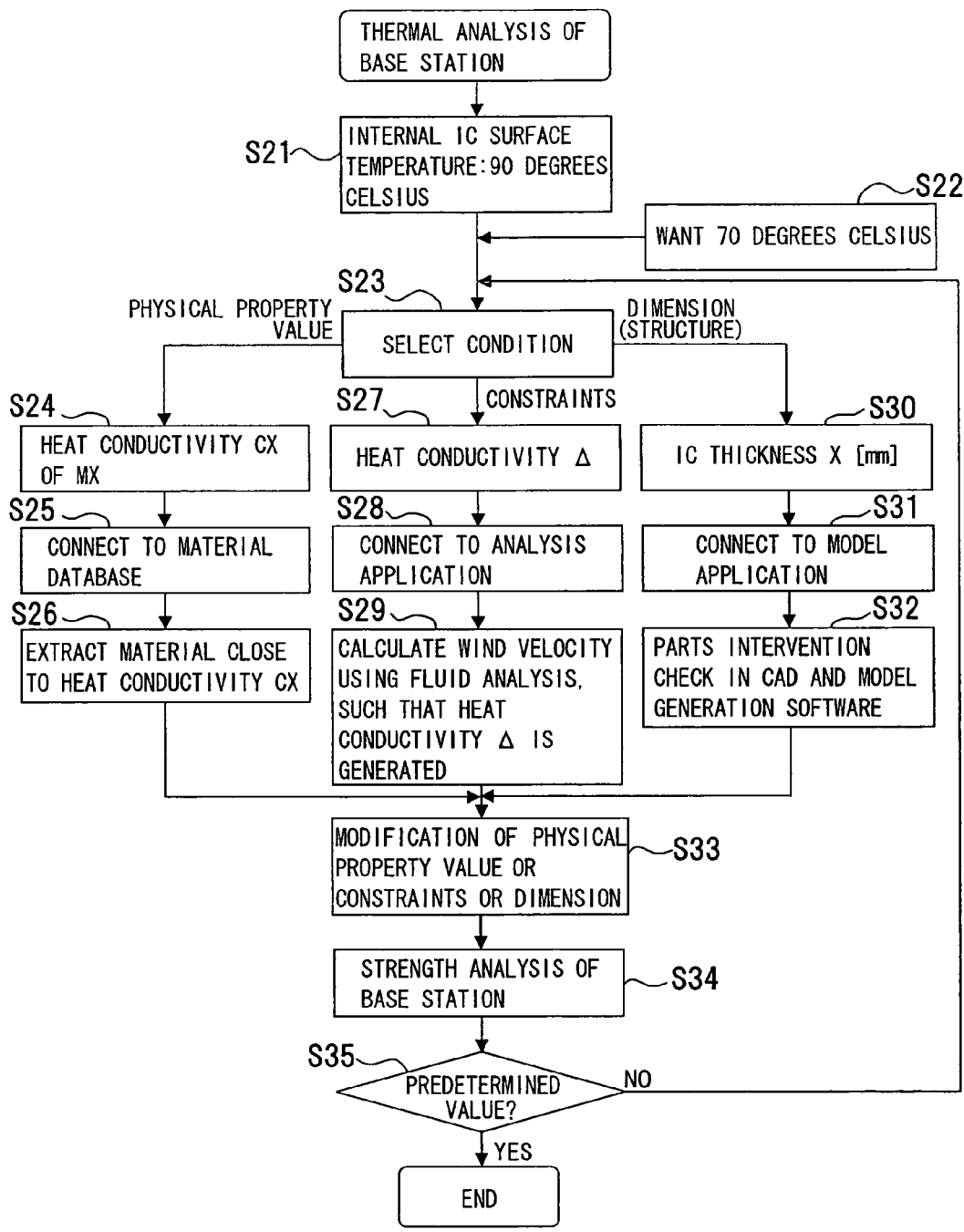
FIG. 11 is a flowchart showing processing procedures of a heat transmission analysis in accordance with another embodiment of the optimization analysis method or program.

Variation examples of optimization analysis in accordance with the second embodiments will be described with reference to FIG. 11. FIG. 11 is a flowchart showing other processing procedures of a heat transmission analysis as another embodiment in accordance with optimization analysis method or program of the present invention.

Although, in the processing procedures of FIG. 7, the cost calculation and the evaluation processing is performed after the processing for deciding whether the predetermined value is achieved or not in step S35, the structure may be changed such that the optimum solution is obtained without performing the cost calculation and the evaluation processing, as shown in FIG. 11.

Features and the variation examples of above embodiment are listed as follows.

(1) As an optimization analysis device with a function for approaching to the target value, a plurality of analysis conditions are set as, for example, determination of physical property values, modification of constraints and modification of dimensions (model).

(2) A function is included for searching a physical property value with similar numerical value from the material database after selecting the function for determination of physical property values.

(3) A function is included for connecting an applicable constraints (temperature, joining) from a function for modifying constraints to, for example, a fluid analysis in a simulation HUB to find a heat conductivity or wind velocity condition.

(4) A function is included for connecting CAD or a model solver in the simulation HUB after selecting the modification of dimensions (model) to modify a model.

(5) A function is included for specifying a range of modification of physical property values and dimensions which are initial conditions of the optimization analysis device and deriving an optimum solution within that range.

(6) A function is included for enabling the product cost calculation from design drawings verified by analyses of selected materials.

(7) By using above optimization analysis device, instead of executing calculations with initially input analysis conditions to obtain only the results of the calculations so that analysts and designers search conditions for target values, answers can be obtained about what items should be set to what values to obtain the target values. Therefore, product development man-hours and design man-hours can be reduced, and in the aspect of costs, since the cost calculations can be executed from materials, dimensions and process methods input into the design drawings, a clue for cost cutting and optimum costs can be found in short period of time.

(8) Specifically, the optimum solution can be obtained by inputting a range of modification of physical property values and dimensions in advance and by repeating an analysis and calculation for approaching to the target value.

(9) Also, modification condition of dimensions and conditions can be easily finded by connecting with systems for finding other conditions, for example, the analysis solver, CAD and the model generation system using the simulation HUB, and the optimum solution can be found with reference to wide range of data.

(10) Cost conversion on the product level can be easily performed by connection with the physical property database and by having the cost database for processes and materials.

(11) Although, in above embodiments, designs and cost calculations are illustrated for a device including a substrate, the present invention is not limited to such design processing. For example, the analysis conditions such as physical property values for the heat transmission analysis, the constraints and dimensions are illustrated for the purpose of illustration, and the present invention can be utilized for analyses using various analysis conditions and is not limited to above embodiments.

(12) Although, in above embodiments, the strength analysis is illustrated, the present invention is not limited to strength such as mechanical strength or thermal strength and can be used for analysis of reliability and safety. For example, the present invention can be imparted to analyses of reliability and safety by using property values which indicate that stainless has low heat conductivity and higher safety in respect to strength or that aluminum has high heat conductivity and low mechanical strength, for example.

(13) Above optimization analysis device can be imparted to a single computer, or a plurality of computers constructing a network or information processing which performs analyses by relocating data with a recording medium, regardless of the form of the information processing device.

Although the most preferred embodiments of the present invention have been described hereinabove, it is to be appreciated that the present invention is not limited to the above description and that various changes and modifications will naturally occur to those skilled in the art without departing from the spirit of the invention described in the appended claims or disclosed herein. Moreover, needless to say, such changes and modifications are encompassed in the scope of the present invention.

The entire disclosure of Japanese Patent Application No. 2004-237701 including specification, claims, drawings and summary are incorporated herein by reference in its entirety.

What is claimed is:

1. An optimization analysis device deriving an optimum solution from a pre-specified range by executing analysis with plural analysis conditions, the device comprising:
    an analysis unit executing an analysis with analysis conditions imparted thereto, parameters of the analysis conditions for obtaining an optimum solution being imparted prior to said analysis;
    an evaluation unit evaluating analysis results of the analysis unit; and
    a condition modification unit modifying the analysis conditions imparted to the analysis unit by selecting from said plural analysis conditions imparted prior to said analysis when said analysis results are not within the pre-specified range,
    wherein the analysis unit, linking with a plurality of databases, is connected directly or via a web connection to a database corresponding to an analysis condition that is selected from the imparted plural analysis conditions, and the analysis unit gives the analysis results from the corresponding database by using parameters of the selected analysis condition,
    the analysis unit links other analysis systems and causes the other analysis systems to execute other analysis with different analysis conditions, or execute the analysis again with other analysis conditions, based on the analysis results given from the corresponding database;
    said modifying adds a priority order to the analysis conditions, and selects the analysis conditions in the priority order; and
    the analysis unit iteratively executes the analysis using the analysis conditions in said priority order until the optimum solution within the pre-specified range is derived, and stores the derived optimum solution in a storage.

2. The optimization analysis device of claim 1, wherein the analysis conditions are physical property values, constraints or dimensions of a product.

3. The optimization analysis device of claim 1, wherein the analysis unit searches approximate physical property values from a material database in case that the physical property values are imparted as the analysis conditions.

4. The optimization analysis device of claim 1, wherein the analysis unit calculates a heat conductivity or a wind velocity condition by the analysis in case that the constraints of the product are selected as the analysis conditions.

5. The optimization analysis device of claim 1, wherein the analysis unit generates a model using the dimensions as parameters and modifies the model by the analysis in case that the dimensions of the product are selected as the analysis conditions.

6. The optimization analysis device of claim 1, wherein the device is operable to change the physical property values, constraints or dimensions as the analysis conditions imparted to the analysis unit to derive an optimum solution.

7. An optimization analysis device deriving an optimum solution from a pre-specified range by executing analysis with plural analysis conditions, the device comprising:
    an analysis unit executing an analysis with the analysis conditions imparted thereto, parameters of the analysis conditions for obtaining an optimum solution being imparted prior to said analysis;
    an evaluation unit evaluating analysis results of the analysis unit;
    a conversion unit converting the analysis results into prices;
    a price evaluation unit evaluating the prices obtained by the conversion unit; and
    a condition modification unit modifying the analysis conditions imparted to the analysis unit by selecting from said plural analysis conditions imparted prior to said analysis when evaluation results of the evaluation unit or of the price evaluation unit are not within the pre-specified range,
    wherein the analysis unit, linking with a plurality of databases, is connected directly or via a web connection to a database corresponding to an analysis condition that is selected from the imparted plural analysis conditions, and the analysis unit gives the analysis results from the corresponding database by using parameters of the selected analysis condition,
    the analysis unit links other analysis systems and causes the other analysis systems to execute other analysis with different analysis conditions, or execute the analysis again with other analysis conditions, based on the analysis results given from the corresponding database;
    said modifying adds a priority order to the analysis conditions, and selects the analysis conditions in the priority order; and
    the analysis unit iteratively executes the analysis using the analysis conditions in the priority order until the optimum solution within the pre-specified range is derived, and stores the derived optimum solution in a storage.

8. The optimization analysis device of claim 7, wherein the analysis conditions are physical property values, constraints or dimensions of a product.

9. The optimization analysis device of claim 7, wherein the analysis unit searches approximate physical property values from a material database in case that the physical property values are imparted as the analysis conditions.

10. The optimization analysis device of claim 7, wherein the analysis unit calculates a heat conductivity or a wind velocity condition by the analysis in case that the constraints of the product are selected as the analysis conditions.

11. The optimization analysis device of claim 7, wherein the analysis unit generates a model using the dimensions as parameters and modifies the model by the analysis in case that the dimensions of the product are selected as the analysis conditions.

12. The optimization analysis device of claim 7, wherein the device is operable to change the physical property values, the constraints or the dimensions as the analysis conditions imparted to the analysis unit to derive an optimum solution.

13. An optimization analysis device, comprising:
an analysis unit executing an analysis with analysis conditions imparted thereto, parameters of the analysis conditions for obtaining an optimum solution being imparted prior to said analysis;
an evaluation unit evaluating analysis results of the analysis unit;
a conversion unit converting the analysis results into prices and calculating a product cost from one or both of a design drawing and a selected material of a product;
a price evaluation unit evaluating the prices obtained by the conversion unit; and
a condition modification unit modifying the analysis conditions imparted to the analysis unit by selecting from said plural analysis conditions imparted prior to said analysis when said analysis results on evaluation results of the evaluation unit or of the price evaluation unit are not within the pre-specified range, and
wherein the analysis unit, linking with a plurality of databases, is connected directly or via a web connection to a database corresponding to an analysis condition that is selected from the imparted plural analysis conditions, and the analysis unit gives the analysis results from the corresponding database by using parameters of the selected analysis condition,
the analysis unit links other analysis systems and causes the other analysis systems to execute other analysis with different analysis conditions, or execute the analysis again with other analysis conditions, based on the analysis results given from the corresponding database; and
the analysis unit iteratively performs one or more analyses based on said modifying of the analysis conditions in a priority order until the optimum solution is derived, and storing the derived optimum solution in a storage.

14. An optimization analysis method, comprising:
analyzing with given analysis conditions, parameters of the analysis conditions for obtaining an optimum solution being imparted prior to said analyzing, wherein with linking with a plurality of databases, via a direct connection or through a web connection to a database corresponding to an analysis condition that is selected from the given analysis conditions, analysis results are given from the corresponding database by using parameters of the selected analysis condition;
evaluating the analysis results of the analyzing;
adding a priority order to the analysis conditions by selecting from plural analysis conditions imparted prior to said analyzing when said results of the evaluating are not within a specified range and modifying the given analysis conditions by selecting the analysis conditions in the priority order, and
iteratively performing one or more analyses based on said modifying of the analysis conditions until the optimum solution within the specified range is derived, and storing the derived optimum solution in a storage,
wherein other analysis systems are linked to execute other analysis with different analysis conditions, or execute the analysis again with other analysis conditions, based on the analysis results given from the corresponding database.

15. An optimization analysis method, comprising:
analyzing with given analysis conditions, parameters of the analysis conditions for obtaining an optimum solution being imparted prior to said analyzing, wherein with linking with a plurality of databases, via a direct connection or through a web connection to a database corresponding to an analysis condition that is selected from the given analysis conditions, analysis results are given from the corresponding database by using parameters of the selected analysis condition;
evaluating the analysis results of the analyzing;
converting the analysis results into prices;
evaluating the prices obtained by the converting; and
adding a priority order to the analysis conditions when said evaluation results of the evaluating are not within a pre-specified range and modifying the analysis conditions by selecting from said given analysis conditions imparted prior to said analyzing in the priority order; and
iteratively performing one or more analyses based on said modifying of the analysis conditions until the optimum solution is derived, and storing the derived optimum solution in a storage,
wherein other analysis systems are linked to execute other analysis with different analysis conditions, or execute the analysis again with other analysis conditions, based on the analysis results given from the corresponding database.

16. An optimization analysis program run by a computer, the program causing the computer to execute operations, comprising:
analyzing with given analysis conditions, parameters of the analysis conditions for obtaining an optimum solution being imparted prior to said analyzing, wherein with linking with a plurality of databases, via a direct connection or a web connection to a database corresponding to an analysis condition that is selected from the given analysis conditions, analysis results are given from the corresponding database by using parameters of the selected analysis condition;
evaluating the analysis results of the analyzing;
adding a priority order to the analysis conditions when said evaluation results of the evaluating are not within a specified range and modifying the analysis conditions by selecting from said given analysis conditions imparted prior to said analyzing in the priority order; and
iteratively performing one or more analyses based on said modifying of the analysis conditions until the optimum solution within the specified range is derived, and storing the derived optimum solution in a storage,
wherein other analysis systems are linked to execute other analysis with different analysis conditions, or execute the analysis again with other analysis conditions, based on the analysis results given from the corresponding database.

17. An optimization analysis program run by a computer, the program causing the computer to execute operations, comprising:
analyzing with given analysis conditions, parameters of the analysis conditions for obtaining an optimum solution being imparted prior to said analyzing, wherein with linking with a plurality of databases, via a direct connection or a web connection to a database corresponding to an analysis condition that is selected from the given analysis conditions, analysis results are given from the corresponding database by using parameters of the selected analysis condition;

evaluating the results of the analyzing;

adding a priority order to the analysis conditions when said evaluation results of the evaluating are not within a specified range and providing the analysis conditions modified by selecting from said given analysis conditions imparted prior to said analyzing in the priority order; and iteratively performing analyses through the priority-based modification of the analysis conditions until the optimum solution within the specified range is derived, and storing the derived optimum solution in a storage, wherein other analysis systems are linked to execute other analysis with different analysis conditions, or execute the analysis again with other analysis conditions, based on the analysis results given from the corresponding database.

18. An optimization analysis program run by a computer, the program causing the computer to execute operations, comprising:

analyzing with given analysis conditions, parameters of the analysis conditions for obtaining an optimum solution being imparted prior to said analyzing, wherein with linking with a plurality of databases, via a direct connection or via a web connection to a database corresponding to an analysis condition that is selected from the given analysis conditions, analysis results are given from the corresponding database by using parameters of the selected analysis condition;

evaluating the analysis results of the analyzing;

converting the analysis results into prices;

evaluating the prices obtained by the converting;

adding a priority order to the analysis conditions when said evaluation results of the evaluating are not within a pre-specified range and modifying the given analysis conditions by selecting from said given analysis conditions imparted prior to said analyzing in the priority order; and iteratively performing one or more analyses based on said modifying of the analysis conditions until the optimum solution is derived, storing the derived optimum solution in a storage, wherein other analysis systems are linked to execute other analysis with different analysis conditions, or execute the analysis again with other analysis conditions, based on the analysis results given from the corresponding database.

19. A computer program product containing an optimization analysis program recorded on a computer readable medium, the program causing the computer to execute operations, comprising:

analyzing with given analysis conditions, parameters of the analysis conditions for obtaining an optimum solution being imparted prior to said analysis, wherein with linking with a plurality of databases, via a direct connection or via a web connection to a database corresponding to an analysis condition that is selected from the given analysis conditions, analysis results are given from the corresponding database by using parameters of the selected analysis condition;

evaluating the analysis results of the analyzing;

adding a priority order to the analysis conditions when said evaluation results of the evaluating are not within a specified range and modifying the given analysis conditions by selecting from said given analysis conditions imparted prior to said analyzing in the priority order; and iteratively performing one or more analyses based on said modifying of the analysis conditions until the optimum solution within the specified range is derived, and storing the derived optimum solution in a storage, wherein other analysis systems are linked to execute other analysis with different analysis conditions, or execute the analysis again with other analysis conditions, based on the analysis results given from the corresponding database.

20. A computer program product containing an optimization analysis program recorded on a computer readable medium, the program causing the computer to execute operations, comprising:

analyzing with given analysis conditions, parameters of the analysis conditions for obtaining an optimum solution being imparted prior to said analyzing, wherein with linking with a plurality of databases, via a direct connection or via a web connection to a database corresponding to an analysis condition that is selected from the given analysis conditions, analysis results are given from the corresponding database by using parameters of the selected analysis condition;

evaluating the results of the analyzing;

adding a priority order to the analysis conditions when said evaluation results of the evaluating are not within a specified range and providing the analysis conditions modified by selecting from said given analysis conditions imparted prior to said analyzing in the priority order; and iteratively performing analyses through the priority-based modification of the analysis conditions based on said modifying until the optimum solution within the specified range is derived, and storing the derived optimum solution in a storage, wherein other analysis systems are linked to execute other analysis with different analysis conditions, or execute the analysis again with other analysis conditions, based on the analysis results given from the corresponding database.

21. A computer program product containing an optimization analysis program recorded on a computer readable medium, the program causing the computer to execute operations, comprising:

analyzing with given analysis conditions, parameters of the analysis conditions for obtaining an optimum solution being imparted prior to said analyzing, wherein with linking with a plurality of databases, via a direct connection or via a web connection to a database corresponding to an analysis condition that is selected from the given analysis conditions, analysis results are given from the corresponding database by using parameters of the selected analysis condition;

evaluating the analysis results of the analyzing;

converting the analysis results into prices;

evaluating the prices obtained by the converting;

adding a priority order to the analysis conditions when said evaluation results of the evaluating are not within a specified range and modifying the given analysis conditions by selecting from said given analysis conditions imparted prior to said analyzing in the priority order; and iteratively performing one or more analyses based on said modifying of the analysis conditions until the optimum solution is derived, storing a derived optimum solution in a storage, wherein other analysis systems are linked to execute other analysis with different analysis conditions, or execute the analysis again with other analysis conditions, based on the analysis results given from the corresponding database.

22. An optimization method, comprising:

setting analysis conditions having an analysis priority order, parameters of the analysis conditions for obtaining an optimum solution being imparted prior to analysis; and iteratively performing numerical analysis by selecting from said analysis conditions imparted prior to said analysis in a priority order until analysis results are determined as optimum, so as to derive analysis results within a specified range, and wherein, with linking a plurality of databases and via a direct connection or a web connection with a database corresponding to a selected analysis condition, the analysis results are evaluated by referring to the corresponding database by using parameters of the selected analysis condition to determine whether other numerical analysis is performed based on evaluation results thereof, wherein other analysis systems are linked and when the other numeric analysis is performed, the other analysis systems are made to execute the other numeric analysis with different analysis conditions.

23. An optimization analysis method for deriving optimum analysis results from a pre-specified range by executing analysis with analysis conditions, the method comprising:

performing iteratively, numerical analysis based on the analysis conditions using the analysis conditions in priority order until optimum analysis results are derived in the pre-specified range, parameters of the analysis conditions for obtaining an optimum solution being imparted prior to said analysis and said performing including modifying said analysis conditions by selecting from predetermined plural conditions, and wherein, with linking a plurality of databases and via a direct connection or a web connection with a database corresponding to a used analysis condition, the optimum solution is evaluated with referring to the corresponding database by using parameters of the used analysis condition to determine whether other numerical analysis is performed based on the evaluation results thereof, other analysis systems are linked and when the other numeric analysis is performed, the other analysis systems are made to execute the other numeric analysis with different analysis conditions.

24. A method of optimizing analysis, comprising:

evaluating whether a result of an analysis using conditions, to which a priority order is added in advance, provides an optimum solution, parameters of said conditions for deriving said optimum solution within a range being identified prior to said analysis; and linking with a plurality of databases, and via a direct connection or a web connection to a database corresponding to a condition selected from the conditions, obtaining analysis results from the corresponding database by using parameters of the selected condition to adjust said conditions by selecting from said conditions according to the priority order added in advance until the analysis results reach said optimum solution within the range and generating a model indicating cost in accordance with said optimum solution, wherein other analysis systems are linked to execute other analysis with different analysis conditions, or execute the analysis again with other analysis conditions, based on the analysis results given from the corresponding database.

* * * * *